(12) United States Patent
Moore

(10) Patent No.: US 7,174,671 B2
(45) Date of Patent: Feb. 13, 2007

(54) ARTIFICIAL SEEDBEDS AND METHOD FOR MAKING SAME

(75) Inventor: Don Moore, Kingsport, TN (US)

(73) Assignee: EZGreen Associates, LLC, Kingport, TN (US)

( * ) Notice: Subject to any disclaimer, the term of this patent is extended or adjusted under 35 U.S.C. 154(b) by 0 days.

(21) Appl. No.: 10/883,122

(22) Filed: Jun. 30, 2004

(65) Prior Publication Data

US 2004/0237388 A1 Dec. 2, 2004

Related U.S. Application Data

(63) Continuation of application No. 10/060,577, filed on Jan. 30, 2002, now abandoned.

(51) Int. Cl.
A01C 1/04 (2006.01)
(52) U.S. Cl. ........................................................ 47/56
(58) Field of Classification Search ................ 428/172; 47/56
See application file for complete search history.

(56) References Cited

U.S. PATENT DOCUMENTS

| | | | |
|---|---|---|---|
| 2,648,165 A | 8/1953 | Nestor | |
| 2,826,865 A | 3/1958 | Chohamin | |
| 2,909,003 A | 10/1959 | Marshall | |
| 3,914,901 A | 10/1975 | Muldner | |
| 3,981,100 A | 9/1976 | Weaver et al. | |
| 4,066,490 A | 1/1978 | Yoshimi | |
| 4,173,844 A | 11/1979 | Knolle et al. | |
| 4,190,981 A | 3/1980 | Muldner | |
| 4,283,880 A | 8/1981 | Fjeldsa | |
| 4,318,248 A | 3/1982 | Muldner | |
| 4,357,780 A * | 11/1982 | Ball | 47/56 |
| 4,414,776 A * | 11/1983 | Ball | 47/56 |
| 4,584,790 A | 4/1986 | Gaughen | |
| 4,604,313 A * | 8/1986 | McFarland et al. | 428/172 |
| 4,786,550 A * | 11/1988 | McFarland et al. | 442/118 |
| 5,073,401 A | 12/1991 | Mohr | |
| 5,274,951 A | 1/1994 | Besing | |
| 5,404,671 A | 4/1995 | Farrow, Jr. et al. | |
| 5,555,674 A | 9/1996 | Molnar et al. | |
| 5,585,150 A * | 12/1996 | Sheehan | 428/15 |
| 5,693,162 A | 12/1997 | Gustafsson et al. | |
| 5,853,541 A | 12/1998 | Monroe et al. | |
| 5,879,695 A * | 3/1999 | Bastiaansen et al. | 424/405 |
| 5,887,382 A | 3/1999 | Marshall et al. | |
| 6,029,395 A * | 2/2000 | Morgan | 47/9 |
| 6,070,358 A | 6/2000 | Meikle et al. | |
| 6,088,957 A | 7/2000 | Kazemzadeh | |

(Continued)

FOREIGN PATENT DOCUMENTS

EP 0572728 A1 8/1993

(Continued)

Primary Examiner—Francis T. Palo
(74) Attorney, Agent, or Firm—Saliwanchik, Lloyd & Saliwanchik

(57) ABSTRACT

An artificial seedbed is disclosed comprising a foundation of virgin, re-processed or waste pulp formed by an aqueous based compression system, a dry non-woven air-blown system containing a cellulose-based binder or adhesive or a dry non-woven needle punched system containing a cellulose-based binder or adhesive. The seedbed can contain seeds, fertilizers, growth hormones, hydrogels, herbicides, fungicides, insecticides, or any other additive to promote the germination and the growth of the seeds and surrounding landscape.

7 Claims, 5 Drawing Sheets

U.S. PATENT DOCUMENTS 6,135,672 A    10/2000   Davidson
6,293,045 B1 *  9/2001   Morgan ........................... 47/9
6,324,781 B1   12/2001   Stevens
6,357,176 B2    3/2002   Baldwin et al.
6,389,745 B1    5/2002   Huh
6,446,386 B1    9/2002   Holloway

FOREIGN PATENT DOCUMENTS

| | | | |
|---|---|---|---|
| FR | 2707832 A1 | 1/1995 | |
| GB | 2191925 A | 12/1987 | |
| GB | 2270453 A * | 3/1994 | |
| JP | 404084808 A * | 3/1992 | ............... 47/56 |
| WO | WO 01/64017 A1 | 9/2001 | |

* cited by examiner

ARTIFICIAL SEEDBEDS AND METHOD FOR MAKING SAME

CROSS-REFERENCE TO RELATED APPLICATION

This application is a continuation of U.S. application Ser. No. 10/060,577, filed Jan. 30, 2002, now abandoned.

FIELD OF THE INVENTION

This invention relates to the manufacture and use of non-woven materials containing 100% cellulose fiber as a medium for incorporating seeds, fertilizer, moisture absorbing hydrogels and/or herbicides as needed into seedbeds. It is particularly concerned with providing seedbeds having a basic cellulose foundation containing no synthetic material that are entirely biodegradable.

BACKGROUND OF THE INVENTION

Vegetation has been utilized to provide aesthetic value and soil stabilization for many years. One particular problem with vegetation is the time that it takes for the vegetation to propagate and/or root into the soil. Seed germination suffers from the deficiencies of slow root growth and inadequate water retention. To facilitate vegetation growth, prefabricated seed carriers were developed, such as disclosed in for example, U.S. Pat. No. 2,648,165 to Nestor; U.S. Pat. No. 2,826,865 to Chohamin; U.S. Pat. No. 2,909,003 to Marshall; and U.S. Pat. No. 3,914,901 to Muldner.

Seed carriers are well known in the art and often suffer from problems in that they are difficult to handle, contain non-biodegradable components, contain non-homogenous mixtures, suffer poor water retention characteristics, and have a poor shelf life.

Many of the seed carriers developed have utilized synthetic nettings, woven and other sheet materials as support media. Nettings often are too weak to provide sufficient soil stabilization, have a tendency to tear during application, and are otherwise generally difficult to handle. The synthetic materials are expensive, and, being non-degradable, tend to be raised by vegetation growing beneath. The netting can become dislodged by increased traffic and high winds. Eventually the netting must be removed by hand and often effective control of erosion ceases.

In an effort to expedite the bio-degradation of the support media, seed carriers utilized biodegradable materials such as light paper as backing material, for example, as in U.S. Pat. No. 4,173,844 to Knolle et al.; and U.S. Pat. Nos. 4,190,981 and 4,318,248 to Mulder.

U.S. Pat. No. 4,283,880 to Fjeldsa discloses a "peat paper" wherein sphagnum peat moss is utilized as a vector material for seeds.

Existing nettings have been employed or suggested for use in applications such as landscaping, highway construction and maintenance, and strip mine recovery. With the possible exception of certain landscaping applications, all such cases require a system needing little maintenance once the area covered by the netting is planted. It would be highly desirable to have a product that would degrade completely, allow full development of vegetation, and provide substantial erosion control.

U.S. Pat. No. 4,786,550—McFarland et al.—disclose the use of melt-blown and coform materials to produce an artificial seedbed. The seedbed is comprised of a combination of seeds, fertilizers, herbicides, superabsorbants, and coform, which is the combination of cellulose fibers and a suitable polymer such as polyethylene or polypropylene. While this combination provides for an appropriate seedbed, the biodegradation time remains high due to the polymer contained therein.

Cellulose fibers and cellulose-based materials have been used to manufacture artificial seedbeds for some time, while these materials are beneficial, they have always been used with other synthetic materials which lengthen biodegradation or held together by a woven material or web. Therefore, there remains a need for an artificial seedbed that is stable during the time of seeding, degrades within a reasonable time, does not contain synthetic fibers, and provides protection and nourishment to the seed during germination and sprouting.

BRIEF SUMMARY OF THE INVENTION

An artificial seedbed is disclosed comprising a foundation of virgin, re-processed or waste wood pulp fiber formed by an aqueous-based compression system, a dry non-woven air-blown system containing a cellulose-based binder or adhesive, or a dry non-woven needle punched system containing a cellulose-based binder or adhesive. The seedbed can contain seeds, fertilizers, growth hormones, hydrogels, herbicides, fungicides, insecticides, or any other additive to promote the germination and the growth of the seeds and surrounding landscape.

An artificial seedbed includes a carrier media containing 100% biodegradable cellulose fibers, cellulose-based binder, seeds, fertilizer, herbicide, hydrogels, and growth media homogenously mixed and formed into prefabricated seedbeds having an extended shelf life. The method for making a novel seedbed includes the introduction of cellulose fibers, seeds, fertilizer, herbicide, hydrogels, and growth media via the air lay process, wherein the components are bonded together with a biodegradable cellulose-based bonding agent.

The subject invention has numerous advantages over the prior art. The artificial seedbed of the present invention provides uniform control of seed dispersal. The seeds will not wash away from the site of the bed as they are embedded in the material. The material is light in weight and is much easier to place for seeding than sod. The invention reduces the necessity for frequent watering and allows the seeding of steep slopes. As compared with the use of sod, the seeding of slopes in shady spots is much improved as sod farm grass does not grow well in shade. The article of the invention does not need additional covering to prevent drying out after seeding.

Further, since straw or other material is not necessary, the problem with such materials being unsightly as they are blown around is decreased. A further advantage is that the invention provides protection from birds for the seeds during germination. The material of the invention further will degrade rapidly and its degradation is controllable by the cellulose binding system utilized.

The article of the invention further may contain additives such as pesticides or herbicides to inhibit weed growth and may be colored to give the look of grass even prior to the grass growing. By the use of hydrogels in combination with grass seed, the season for growing grass may be extended beyond the normal fall and spring planting times.

Accordingly, it is an object of the present invention to overcome disadvantages of prior art materials, processes, and apparatus by providing a low cost biodegradable artificial seedbed.

DETAILED DESCRIPTION OF THE INVENTION

Figure 1:
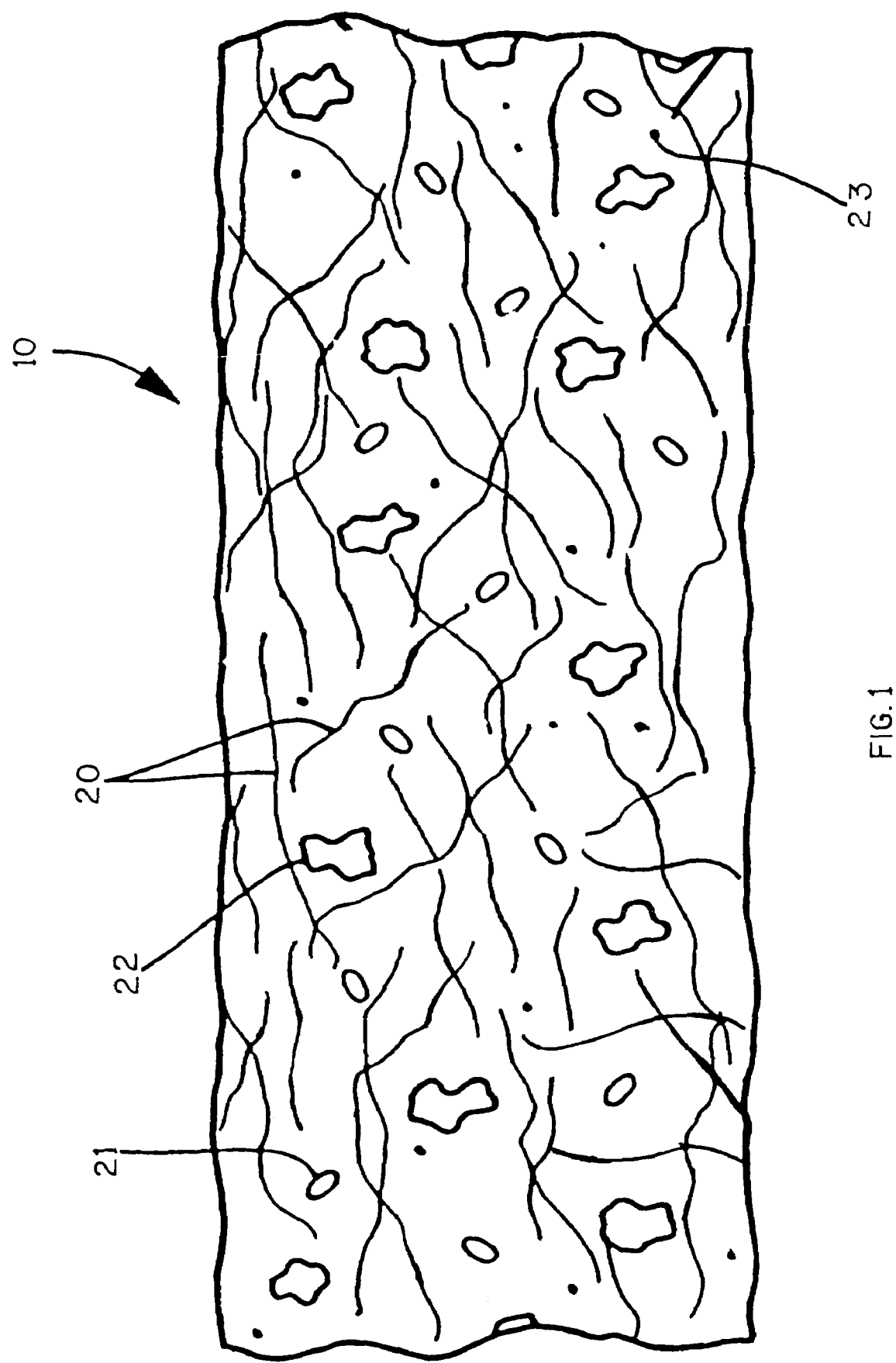
FIG. 1 is a fragmentary cross section of an article of the invention.

Referring now to FIG. 1, a fragmentary cross section of an artificial seedbed in accordance with the invention is shown and generally designated as reference numeral 10. The seedbed 10 of FIG. 1 is composed of a network of wood pulp (cellulose) fibers 20 and cellulose-based adhesive (not shown). The seedbed 10 further contains seed 21 and can optionally include fertilizer 23, hydrogel 22 or other additives beneficial to seed germination and growth such as herbicides, pesticides, insecticides, and growth hormone. The dry hydrogel 22 and seed 21 are securely held within the network of fibers 20. Fibers 20 are held together by a cellulose-based adhesive during extrusion. The air-formed combination of wood pulp fibers and cellulose adhesive is referred to herein as coform. A system for injection of hydrogels into composite materials is disclosed in U.S. Pat. No. 4,604,313 incorporated herein by reference.

Figure 2:
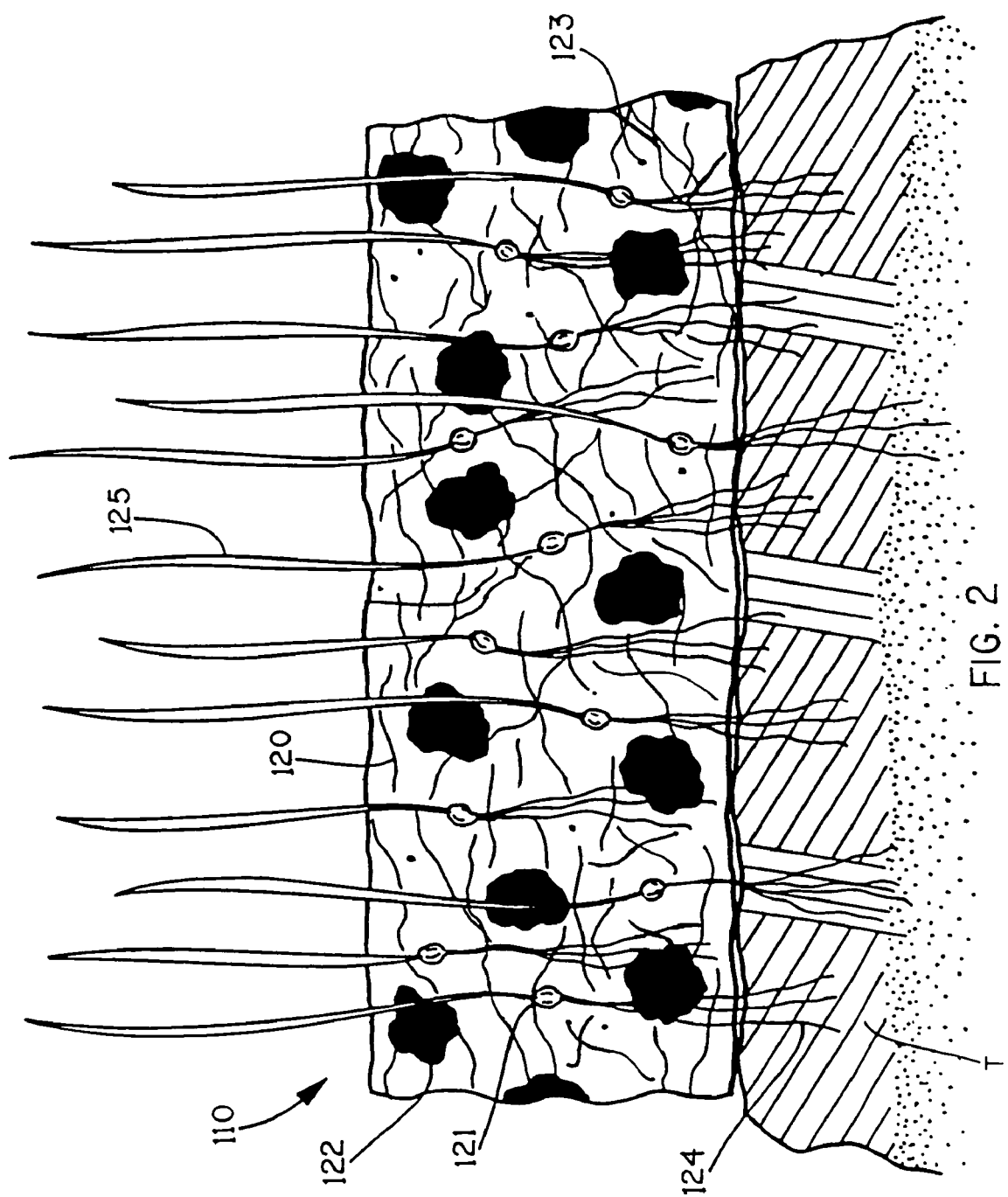
FIG. 2 is a fragmentary cross section of an article of the invention after sprouting.

FIG. 2 illustrates a seedbed 110 in accordance with the invention. The seeds 121 have grown roots 124 and sprouts 125. The roots 124 are penetrating the terrain T. The mingled wood pulp fibers 120 and cellulose adhesive (not shown) have not degraded to a significant extent. The hydrogel 122 has absorbed water and expanded and the fertilizer 123 continues to provide nutrition.

Figure 3:
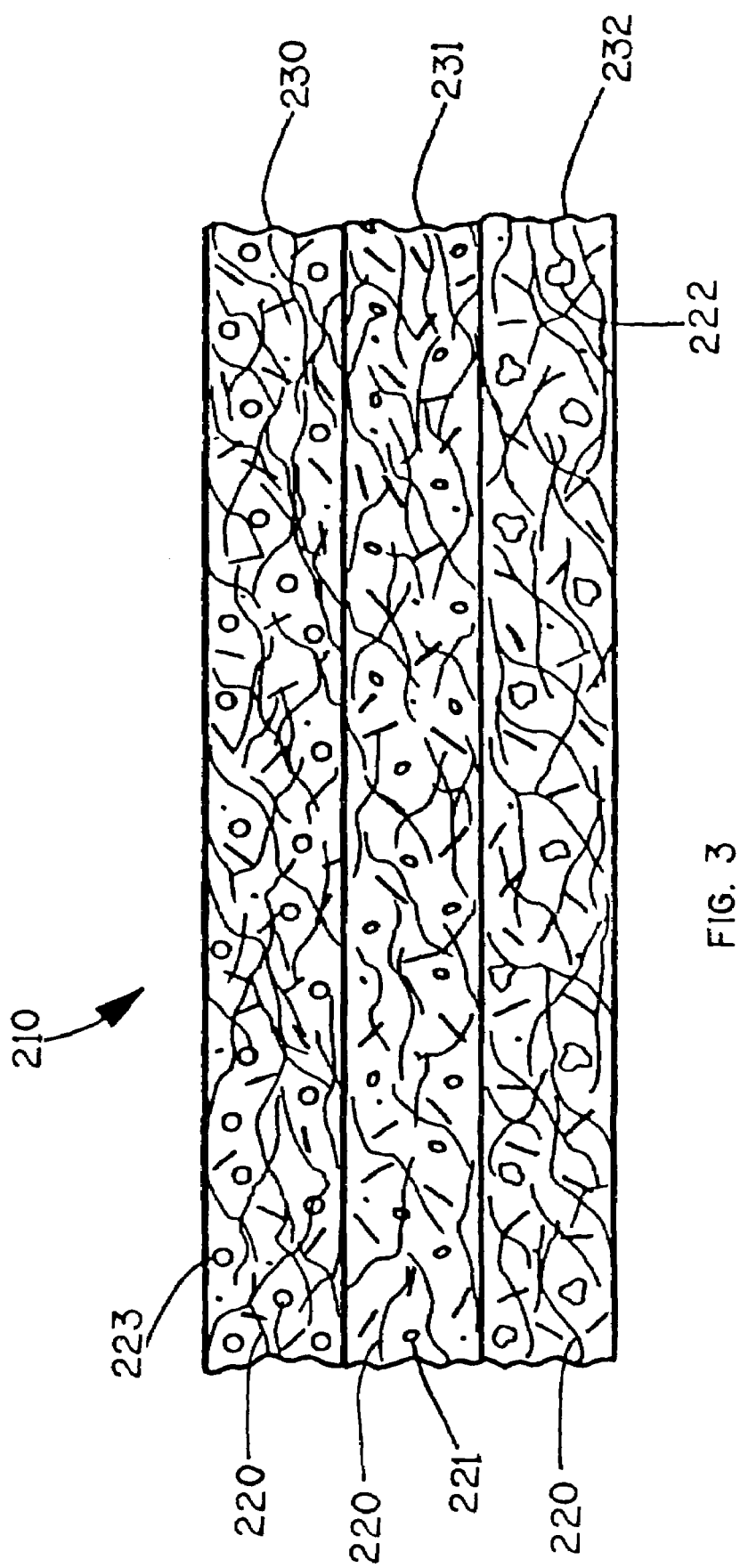
FIG. 3 is fragmentary cross sections of a multilayered seedbed in accordance with the present invention.

FIG. 3 is a cross section of a sheet 210 of the invention comprised of layers 230, 231, and 232. In the embodiment depicted here, sheet 210 is multilayered with each layer containing wood pulp fiber 220. Particles 222 are of hydrogel in the lower layer 232. Particles 221 are seeds in the middle layer 231 while particles 223 are fertilizer in the uppermost layer 230.

In the alternative, a two-layer structure can be formed in accordance with the invention. The two-layer structure is formed with an initial layer that is a composite wood pulp fibers and cellulose-based binder. The upper layer contains seeds, fertilizer, and hydrogels. It is noted that some particles such as seed can migrate to the lower level by withdrawal of air through the structure during forming. The structure can be formed either in a two-bank forming system or in a three-bank system with one bank not operating.

Figure 4:
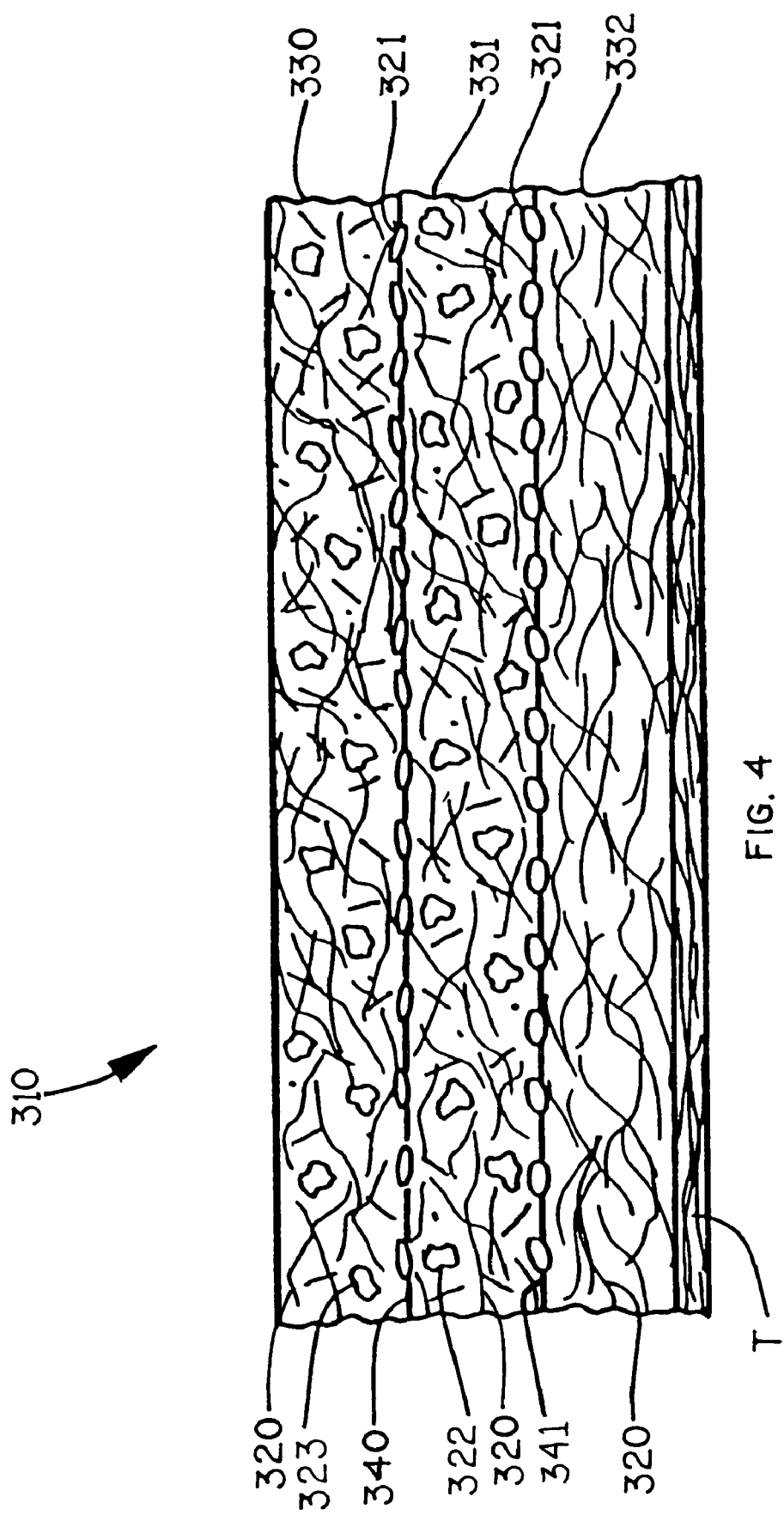
FIG. 4 is a fragmentary cross section of a multilayered seedbed in accordance with the present invention.

Referring now to FIG. 4, in another alternative embodiment, the seedbed 310 is also multilayered with each layer containing wood pulp fiber 320 and cellulose-based binder (not shown). The upper layer 330 is provided with fertilizer 323. The middle layer 331 is provided with hydrogels 322 while the bottom layer 332 to be placed next to the terrain T contains only wood pulp fibers 320 and cellulose-based binder (not shown). As shown in the area 340 between upper layer 330 and middle layer 331 and in the area 341 between middle layer 331 and lower layer 332, seeds 321 or other desirable material may be placed to take advantage of the various properties of the additives. This structure is considered desirable as the seeds 321 are continually kept moist by the above hydrogel 322. The fertilizer, in a dissolvable form, is provided to the seeds as they grow. In another variation of this form, the pulp can be dyed a certain color prior to application to substantially match the terrain and provide a more pleasing artificial bed prior to sprouting. Other variations of the invention are possible with varying the number of extrusion banks, number of injection nozzles, and variety of additives.

Any suitable additive may be provided with the nonwoven meltblown polymer and grass seed composite of the invention. Such additives are color, pesticides such as diazinone, herbicides, fungicides such as copper naphthenate, and rodenticides. Further odor repellents to keep animals such as dogs or cats off new-grown plants can be added. Preferred additives are particularly hydrogels as they provide a moist seedbed for the seeds and fertilizers to provide nutrients.

The seeds added to the substrate may be of any desired variety. Typical of seeds suitable for use in ground covers are sedum, clover, ivy, crown vetch, and flowers such as phlox. The preferred material is grass seed as it is widely grown, low in seed size, and may be handled with normal particle delivery systems. Region specific seeds may be utilized to match surroundings and enhance the chances of germination and growth.

In addition to the use of the seedbeds to provide ground cover, other seeds can be inserted into the seedbeds. For example, ornamental plots propagated by seeds as is well known in the art, may be included in the artificial seedbed. These seeds nonexclusively include Alyssum, Aster, Baby's Breath, Bachelors Button, Dosmos, Four O'clock, Marigold, Moonflower, Morning Glory, Daisy, Sunflower, Sweet Pea, Zinnia, Snap Dragons, Forget-Me-Not, Poppy, Wildflower, Black-eyed Susan, and others.

Another example of seeds to be placed in the seedbed are those used in the vegetable garden. These seeds nonexclusively include Asparagus, Beans, Beets, Broccoli, Brussels Sprouts, Cabbage, Cantaloupe, Carrots, Cauliflower, Collards, Corn, Cowpeas, Cucumbers, Egg Plant, Endive, Gourds, Herbs, Kale, Kohlrabi, Leeks, Lettuce, Melons, Mustard, Okra, Onions, Parsnips, Peas, Pumpkins, Radish, Rutabaga, Spinach, Squash, Tomato, Turnip, Watermelon, and others.

Farmers can also benefit from the use of the instant invention. The ease of use reduces planting time and equipment requirements. Furthermore, farmers in environmentally depressed areas can use cropseed inserted seedbeds to overcome the environmental shortcomings. For example, farmers in arid areas of the world can utilize a seedbed containing cropseeds and hydrogels to reduce the necessity for irrigation and farmers in areas with unfertile soil can include slow release fertilizers in the seedbed to provide the seeds with nutrition throughout germination. Cropseeds which can be included in the seed cover can include corn, barley, wheat, soybean, alfalfa, oats, rye, cotton, sorghum, tobacco, Brassica spp., vetch, silage, and the like.

The sheet products of the invention may be further processed after collection by compacting through heat and pressure to control the sheet thickness. Further, the sheet may be embossed to increase its strength, abrasion-resistance, and ease of measurement and separation.

The superabsorbant or hydrogel particles preferably are those which rapidly absorb and retain large quantities of liquids. A preferred group of particles comprise modified starches, samples of which are described in U.S. Pat. No. 3,981,100, and high molecular weight acrylic polymers containing hydrophilic groups. A wide variety of water-soluble hydrogel particles are readily commercially available and will absorb more than 20 times their weight in water and preferably more than 100 times their weight in water. The absorbent particles may vary in size, but generally are preferred to be between about 50 microns and about 500 microns for good retention in the seedbed and ease of handling during formation without creation of dust in the atmosphere.

The particles of seeds, hydrogels, and other materials may be introduced into the stream of fibers at any convenient point. The seeds may be introduced at a point after the fibers have somewhat bonded such that elevated temperatures do not damage the seeds. However, even if the streams are somewhat hot, the very high rate of cooling during the process will prevent substantial damage to the seeds as cooling will take place before heat can transfer to and damage the seeds which are ordinarily protected by dry insulating husks. The seeds and other particles are sufficiently trapped by mechanical forces that cellulose adhesive bonding is not ordinarily necessary to hold the particles in place. Further, as illustrated in FIG. 4, additives too fragile to be blown into the air stream may be deposited between layers.

The artificial seedbed of the invention may be combined with other products if desirable. Further, it is possible that it would be formed on a tissue paper base or other biodegradable permeable cellulose-based, or otherwise 100% biodegradable member. Formation on a tissue or permeable base would decrease the likelihood of hydrogel or grass seeds being withdrawn through the forming air system below the foraminous belt.

The artificial bed of the invention may be utilized in a variety of ways. Typically, the composite sheets would be placed on the ground and watered until the grass or other seed material sprouted and was rooted. When watered, the seedbed will form to the shape of the terrain and adhere to it thereby reducing the likelihood of movement. The cellulose fibers and binder would then degrade and disperse. Further, it would be possible that entire rolls of the artificial seedbed pre-germinated and then applied to the terrain to provide expedited ground cover. Such a process could be advantageous in seeding areas where fast rooting is particularly desirable. Further, the seedbeds could be applied to special substrate forms to create living sculptures or topiaries.

Figure 5:
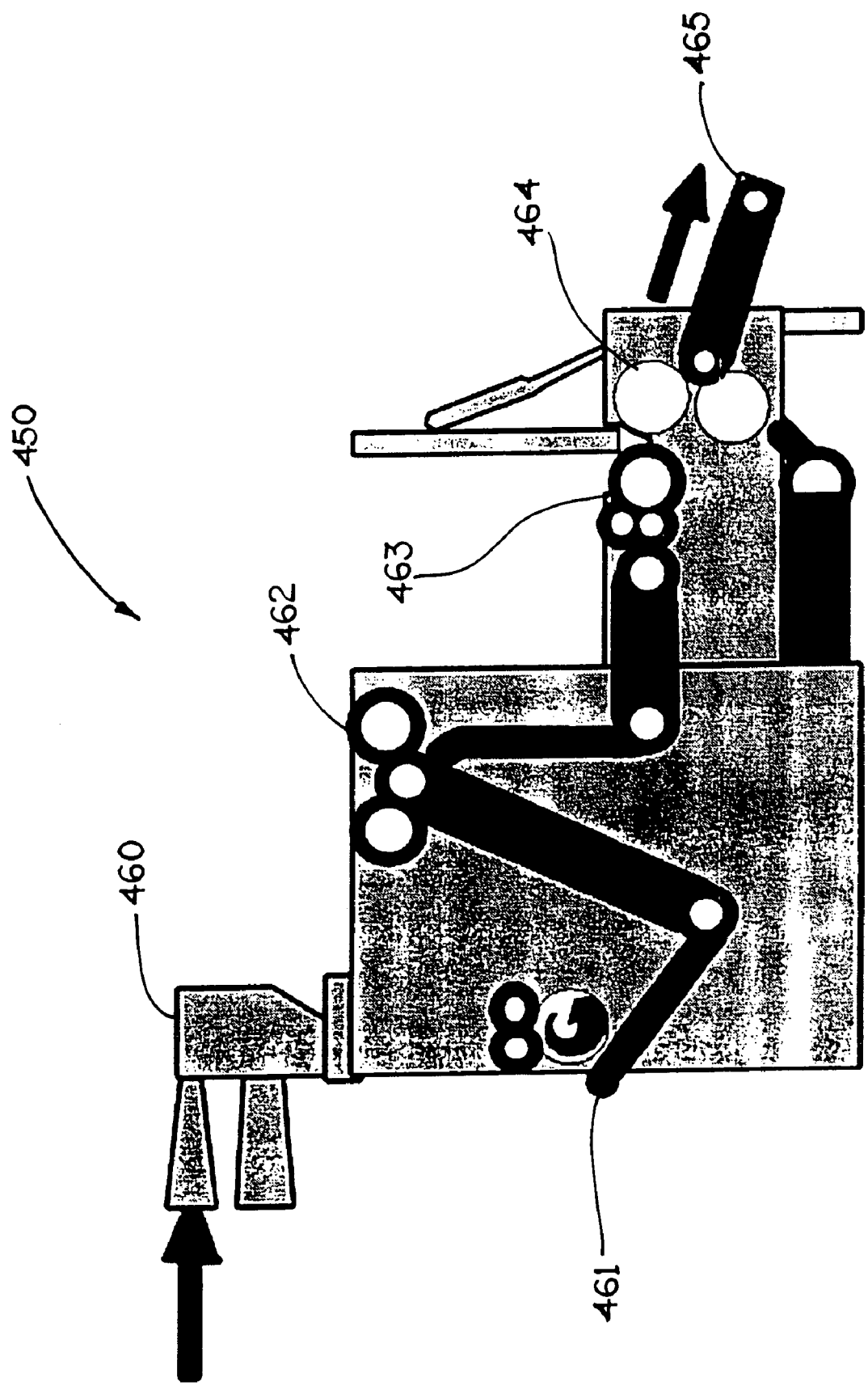
FIG. 5 is a schematic illustration of forming apparatus for the article of the invention.

Referring now to FIG. 5, the apparatus for the manufacture of the seedbed is illustrated and generally designated by the reference numeral 450. Materials are fed into an intake 460 and applied along with wood pulp fibers onto a moving belt 461. Additional intakes (not shown) may be utilized to vary the mixture of the materials or layer the materials throughout the process. As the moving belt 461 proceeds throughout the apparatus 450, the materials may be compressed by rollers 462 to ensure proper density. Before the materials leave the apparatus 450, the materials are heated by a heating apparatus 463 to ensure proper activation of the binding material. Once heated, the material cools and can be passed through an embosser 464 where it can be embossed for strength or scored for separation before it exits on an exit belt 465.

While the invention has generally been described with the addition of cellulose binder into wood pulp fibers, it is possible that other sources of cellulose fibers such as peanut seeds, peat moss, and newsprint could be utilized. Other cellulose materials would be suitable for the invention so long as they provide absorbency and strength to the seedbed.

Inasmuch as the preceding disclosure presents the best mode devised by the inventor for practicing the invention and is intended to enable one skilled in the pertinent art to carry it out, it is apparent that methods incorporating modifications and variations will be obvious to those skilled in the art. As such, it should not be construed to be limited thereby but should include such aforementioned obvious variations and be limited only by the spirit and purview of this application and the scope of the appended claims.

The invention claimed is:

1. A method of making an artificial seedbed comprising the steps of:
    forming a layer of substrate by air-blowing cellulose fibers and a biodegradable cellulose-based binder against a surface, whereby a biodegradeable substrate without synthetic fibers and comprising cellulose fibers and cellulose-based binder is formed;
    depositing seeds on said layer of substrate comprising cellulose fibers and biodegradable cellulose-based binder;
    covering said seeds with another layer of substrate comprising cellulose fibers and biodegradable cellulose-based binder; and
    compacting said layers of substrate with pressure;
    whereby said seeds are sandwiched between said layers of substrate, thereby forming a sheet without synthetic fibers which serves as an artificial seedbed.

2. The method of claim 1, further comprising applying heat to said layers of substrate.

3. The method of claim 1, further comprising the step of embossing said sheet.

4. The method of claim 1, further comprising the step of scoring said sheet.

5. The method of claim 1, further comprising the step of adding one or more of the additives selected from the group consisting of: fertilizers, herbicides, pesticides, insecticides, fungicides, and super-absorbants.

6. The method of claim 1, wherein said depositing step further comprises the uniform application of fertilizer and seeds on said layer of substrate.

7. The method of claim 1, wherein said cellulose fibers are wood-pulp fibers.

* * * * *